(12) United States Patent
Carlen et al.

(10) Patent No.: US 6,532,145 B1
(45) Date of Patent: Mar. 11, 2003

(54) FOIL FOR A FOIL CAPACITOR AND FOIL CAPACITOR

(75) Inventors: Martin Carlen, Niederrohrdorf (CH); Peter Brüesch, Nussbaumen (CH); Hans-Jürg Wiesmann, Seegräben (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/857,108

(22) PCT Filed: Dec. 1, 1999

(86) PCT No.: PCT/CH99/00573
§ 371 (c)(1),
(2), (4) Date: Jun. 1, 2001

(87) PCT Pub. No.: WO00/33335
PCT Pub. Date: Jun. 8, 2000

(30) Foreign Application Priority Data

Dec. 3, 1998 (DE) .......................... 198 56 457

(51) Int. Cl.[7] .............................. H01G 9/145
(52) U.S. Cl. ............... 361/508; 361/273; 361/313; 361/303; 361/305
(58) Field of Search ............... 361/508, 273, 361/313, 301.4, 301.1, 321.2, 328, 309, 308, 310, 305, 303

(56) References Cited

U.S. PATENT DOCUMENTS

| | | | | |
|---|---|---|---|---|
| 3,665,346 A | * | 5/1972 | Orr | 333/70 |
| 3,689,811 A | * | 9/1972 | Hoffman | 317/259 |
| 4,433,359 A | * | 2/1984 | Hamabe et al. | 361/273 |
| 4,434,452 A | * | 2/1984 | Hamabe et al. | 361/304 |
| 4,901,199 A | * | 2/1990 | Foster | 361/308 |
| 5,136,462 A | * | 8/1992 | Steiner | 361/273 |
| 5,550,705 A | * | 8/1996 | Moncrieff | 361/313 |
| 5,696,663 A | * | 12/1997 | Unami et al. | 361/305 |
| 6,184,044 B1 | * | 2/2001 | Sone et al. | 438/3 |

FOREIGN PATENT DOCUMENTS

| | | |
|---|---|---|
| DE | 642447 | 3/1937 |
| DE | 714365 | 11/1941 |
| DE | 19751543 A1 | 5/1998 |
| EP | 0813213 A1 | 12/1997 |
| GB | 2276765 A | 10/1994 |
| WO | WO94/19813 | 9/1994 |

* cited by examiner

Primary Examiner—Dean A. Reichard
Assistant Examiner—Nguyen Ha
(74) Attorney, Agent, or Firm—Burns, Doane, Swecker & Mathis, L.L.P.

(57) ABSTRACT

A description is given of a film for a film capacitor which is formed from an electrically insulating carrier film with an electrically conductive layer applied thereon, the electrically conductive layer in the film capacitor forming an electrode and the carrier film forming a dielectric.

The invention is distinguished by the fact that the electrically conductive layer 2 is made as thin as possible, and that, in order to reduce the total sheet resistance on the electrically conductive layer 2, at least one current path 4, 5 is provided which has a lower sheet resistance than the electrically conductive layer.

12 Claims, 2 Drawing Sheets

FOIL FOR A FOIL CAPACITOR AND FOIL CAPACITOR

TECHNICAL FIELD

The invention relates to a film for a film capacitor which is formed from an electrically insulating carrier film with an electrically conductive layer applied thereon, the electrically conductive layer in the film capacitor forming an electrode and the carrier film forming a dielectric. Furthermore, the invention relates to a film capacitor embodied with such a film.

PRIOR ART

Capacitors are produced, for a wide capacitance range, inter alia as film capacitors, the dielectric comprising a plastic film. The electrodes are formed from two conductive metal surfaces. These two metal surfaces comprise either thin metal films or metal layers vapor-deposited onto the films. The latter capacitors have a self-healing effect, i.e., in the event of an electrical breakdown, the metal layer evaporates in the vicinity of the discharge or at a point provided for this in proximity thereto. The active region is reduced as a result of this, in which case the capacitor can still be used, although with a slightly reduced capacitance.

U.S. Pat. No. 5,136,462 and FR8911713 describe films for a film capacitor which, instead of a continuous metal coating, have a metal coating which is subdivided into individual segments. The individual segments have a low sheet resistance; they are isolated from one another by nonconductive, trench-like cutouts and are electrically connected to one another only via narrow current bridges. These narrow current bridges serve as protection devices which, in the event of an electrical breakdown, isolate the effected segment from the remaining segments, so that the damage caused by an electrical breakdown is limited to a single segment or just a few segments. A capacitor having such a segmented film corresponds to thousands of individual capacitors connected in parallel.

In the case of the segmented film capacitor of EP 0 813 213 A1, the cutouts between the segments are covered with a thin conductive layer. The latter serves to enlarge the active area and also to avoid excess field increases at the edges between electrode segments and uncoated cutouts. The task of the conductive cutouts is, in the case of an electrical breakdown in an electrode segment, to increase the impedance in the vicinity of said segment and to prevent the supply of energy. In this case, the larger the a real portion of the thin conductive layer is chosen to be relative to the electrode segments, the larger the equivalent series resistance of the film capacitor becomes, as a result of which the electrical losses and hence the temperature in the capacitor are increased. However, higher temperatures in the capacitor cause aging phenomena to be accelerated.

WO 94/19813 discloses a film capacitor having a dielectric film with continuous electrodes vapor-deposited thereon. The electrodes are deliberately made relatively thin and have a correspondingly high sheet resistance of 5 to 300Ω. An improved dielectric strength, or increased breakdown voltage, compared with the segmented film capacitor described previously, is obtained by virtue of the increased sheet resistance.

SUMMARY OF THE INVENTION

The invention is based on the object of providing a film for a film capacitor and a film capacitor provided with the film which are only slightly subject to aging phenomena.

The invention is distinguished by the fact that, in a capacitor film having an electrically conductive layer as electrode and a current path structure applied on said layer, the sheet resistance of the layer is chosen to be as large as possible and that of the current path structure is chosen to be as small as possible. The first-mentioned measure results in a reduced loss of capacitance in the case of a breakdown, and the second measure leads to a reduction of the total sheet resistance of electrode and current path structure. As a result, the ohmic losses of the capacitor film are reduced, and thus so is the heating of said film. Both of the measures mentioned thus have a positive effect on the aging phenomena.

The electrically conductive layer of the film according to the invention for a film capacitor has a relatively high sheet resistance. In the event of an electrical breakdown, this high sheet resistance limits the area region at which the electrically conductive layer evaporates, as a result of which the effective electrode area and hence the capacitance of the capacitor are only slightly impaired. In addition, the breakdown voltage is increased and, in the event of breakdown, locally less electrical energy is converted into heat. The provision of a current path structure according to the invention preferably in the form of main and auxiliary current paths results in a reduced total sheet resistance relative to the sheet resistance of the electrically conductive layer. This reduced total sheet resistance reduces the ohmic losses when current flows in the capacitor and hence the temperature increase in the capacitor and thereby has a positive effect on the thermally dictated aging of said capacitor.

The current path structure is preferably composed of the same electrically conductive material as the electrically conductive layer or of a different electrically conductive material than the electrically conductive layer and has a contour raised above the electrically conductive layer. The individual current paths, preferably designed in strip form, are specifically subdivided into main and auxiliary current paths and form electrode structures configured in strip form. The sheet resistance of the current path structure is advantageously reduced by at least a factor of 20 relative to that of the electrically conductive layer. This allows an a really small coverage of less than 10% of the electrode layer by the current path structure without losses in the total sheet resistance reduction sought. The narrower and/or less dense the current paths are made, the smaller, however, is the reduction of the self-healing (high-resistance) electrode area of the capacitor film. As a result of the reduced total sheet resistance and the thin electrode layer, a film capacitor provided with the capacitor film according to the invention has good electrical properties in conjunction with an optimal self-healing behavior, which results in an increased life expectancy.

BRIEF DESCRIPTION OF THE DRAWINGS

The invention is described below by way of example, without restricting the general concept of the invention, using exemplary embodiments with reference to the drawings, in which.

WAYS OF EMBODYING THE INVENTION

Figure 1:
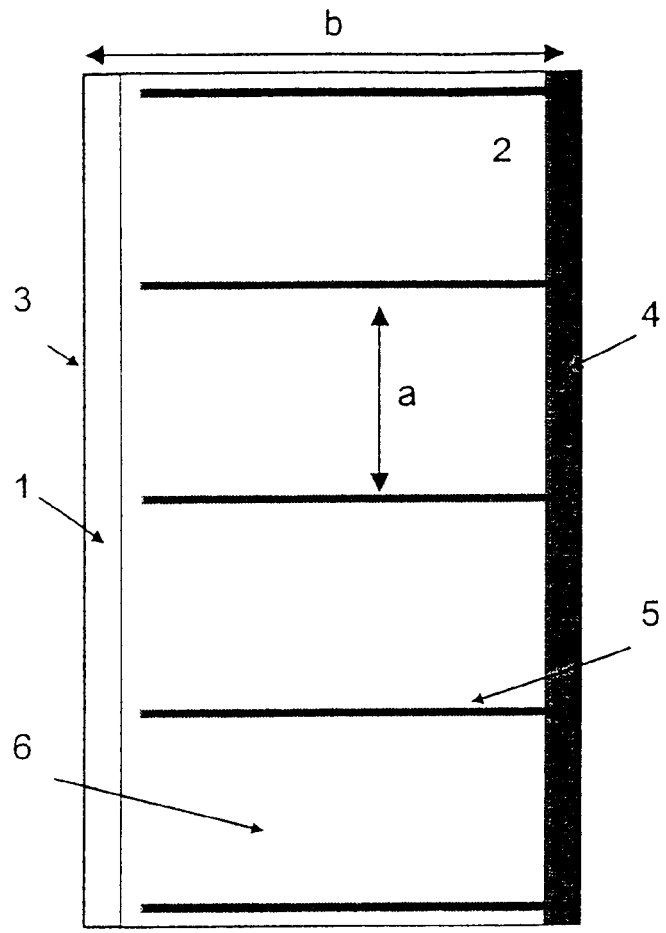
FIGS. 1 to 3 each diagrammatically show a plan view of a region in each case of a capacitor film according to the invention, and FIG. 4 diagrammatically shows a cross-sectional illustration, not true to scale, through a capacitor film designed according to the invention.

FIG. 1 shows a first exemplary embodiment of a film according to the invention for a film capacitor, in plan view.

The film is composed of a carrier film 1 and an electrically conductive layer 2, applied thereon. The electrically conductive layer 2 is preferably designed as a metal layer, but electrically conductive plastic is also suitable for forming this layer.

The carrier film 1, by contrast, is produced from an electrically insulating plastic material. It is also known to use a paper film as carrier material.

The film illustrated in FIG. 1 has a left-hand longitudinal edge 3, along which the carrier film 1 is free of the electrically conductive layer 2, whereas the right-hand edge of the film is provided with a main current path 4. Over the entire length of this main current path, the capacitor film is externally contact-connected and fed. Branching off from the main current path 4 are auxiliary current paths 5, which run at right angles, are oriented parallel to one another and are arranged at a regular distance a. The current path structure composed of the main current path 4 and auxiliary current paths 5 has a lower electrical sheet resistance than the electrically conductive layer 2, since it has a larger thickness than the layer 2. This becomes clear in particular from the illustration in FIG. 4, to which reference will be made below.

The electrically conductive layer 2 and the main and auxiliary current paths 4, 5 may be formed from a single metal coating and differ only in thickness. However, the electrically conductive layer 2, preferably designed as a metal layer, and the current paths 4, 5 may also be composed of different metals. By way of example, it is expedient to form the layer 2 from zinc and the main and auxiliary current paths 4, 5 from aluminum, because the higher conductivity of aluminum makes it possible to keep the thickness of the main and auxiliary current paths 4, 5 small. Instead of current paths produced by metallization, it is also possible to use main and auxiliary current paths 4, 5 comprising a metal film.

The main and auxiliary current paths 4, 5 are preferably arranged in such a way that the electrically conductive layer 2 is subdivided into a plurality of partial regions 6 whose extent is limited at least in one direction, so that the charge stored in the layer 2 can be conducted away via a short distance to the main and auxiliary current paths 4, 5. In the exemplary embodiment illustrated in FIG. 1, the auxiliary current paths 5 are spaced apart from one another by a distance a, so that any point on the layer 2 is not further than a/2 away from the nearest current path. As a result, the distance via which the charge stored in the layer 2 is conducted to a current path is limited to a/2. The form of the partial regions 6 formed between the current paths 5 can inherently be chosen as desired, e.g. in strip form, square, rhomboid, etc.

The sheet resistance of the electrically conductive layer 2 should be at least 5Ω and preferably more than 20Ω. The higher the sheet resistance, the smaller the area regions— destroyed in the event of an electrical breakdown—of the layers 2 which form the capacitor electrodes.

In the case of the conventional segmented electrodes described in the introduction, after an electrical breakdown, it is generally the case that entire segments with a size of more than 1 cm² are unusable. With the present choice of an electrode having a high sheet resistance, the area that is evaporated per electrical breakdown can be limited to less than 1 mm². As a result, electrical breakdowns impair the electrical capacitance of the film capacitor to a comparatively lesser extent, for which reason the capacitor exhibits little degradation or breakdown-dictated aging.

In order to prevent excessive heating of the thin electrode during operation, a current path structure bearing on the electrode layer is provided for the purpose of reducing the total sheet resistance. In this case, the lower the sheet resistance of an individual current path, the smaller the degree of coverage of the electrode can be chosen to be without the reduction of the total sheet resistance of electrode and current path structure being jeopardized. A small degree of coverage in turn means a maximal extent of the thinly coated self-healing electrode area, i.e. a minimal influence of the current paths on the self-healing qualities of the electrode. A coverage to be sought of less than 10% of the remaining electrode area is correspondingly achieved by few and/or narrow auxiliary current paths. In a typical example of the capacitor film according to the invention, the sheet resistance of the electrically conductive layer is 70Ω and the sheet resistance of the current paths is 0.5Ω. From this, given a distance a of 3 cm, an auxiliary current path width of 0.1 cm and a film width b of 15 cm, the result is a total sheet resistance, averaged over different directions in the electrode area, of 22Ω.

The film capacitor having segmented electrodes which was explained in the introduction has, for example, a sheet resistance of 7Ω within each partial region. The narrow current bridges increase the total sheet resistance by approximately 3.4-fold, so that it is 24Ω. Although the local sheet resistance in the case of the known film capacitor is significantly lower than in the case of the capacitor according to the invention, the total sheet resistance of the film according to the invention is lower than that of the film of the known capacitor.

Since the loss of capacitance and the aging on account of electrical breakdowns are greater, the lower the local sheet resistance is., and the electrical properties are better, the lower the total sheet resistance is, the film according to the invention and a capacitor formed from the film according to the invention are optimized both with regard to aging and with regard to their electrical properties.

An example with a distance a between the auxiliary current paths of 3 cm and a film width of 15 cm is specified above. The distance a may vary in the range from 2 to 15 cm and the width b may vary in the range from 3 to 30 cm. The width of the auxiliary current paths 5 is less than 10 mm and preferably less than 3 mm.

If both the electrically conductive layer 2 and the main and auxiliary current paths 4, 5 are formed from zinc, then the layer 2 has a thickness of less than 200 Å and the current paths have a thickness of more than 4 000 Å. If the electrically conductive layer 2 applied on the carrier film 1 is formed from zinc and the main and auxiliary current paths 4, 5 are formed from aluminum or a zinc/aluminum alloy, then the electrically conductive layer 2 has a thickness of less than 200 Å and the current paths have a thickness of ore than 2 700 Å. As illustrated, if possible a sheet resistance ratio of more than 20 is to be sought.

Figure 2:
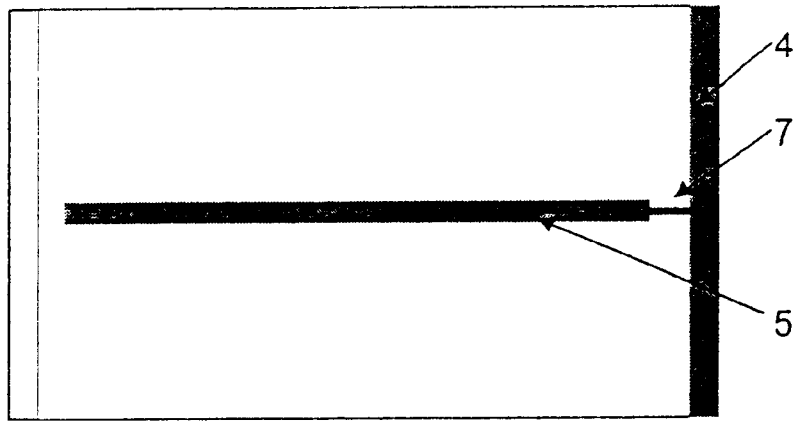

FIG. 2 shows a further exemplary embodiment of the film 1 according to the invention for film capacitors. This film 1 essentially corresponds to the film shown in FIG. 1, for which reason identical elements are designated by identical reference symbols. It differs from said film in that a tapering point 7 serving as protection device is provided in the region where the auxiliary current paths 5 are linked to the main current path 4. Said tapering point serves as additional protection device in the case of a non-self-healing electrical breakdown in the region of the current path 5.

A capacitor according to the invention is either wound from two carrier films coated on one side with a metal layer, the two metal layers each forming an electrode and the carrier film composed of plastic serving as dielectric insulation, or it is wound from a carrier film, which is coated on two sides with a metal layer, and an uncoated film, the two metal layers forming the electrodes and the additional uncoated film serving as insulator. Irrespective of the way in which the capacitor is wound and the films from which it is wound, the result is, in cross section, a sequence of layers which respectively comprise a dielectrically insulating plastic material and a metal layer functioning as electrode.

In multilayer film capacitors, it is necessary to prevent electrical breakdowns which might not be self-healing from occurring between the current paths of successive layers. To that end, it suffices if the main and auxiliary current paths 4, 5 of successive layers are not arranged exactly one above the other but rather offset with respect to one another. This brings about, inter alia, sufficient coordination between winding processes and current path structures.

Prior to the winding process, advantageously on every second singly coated film or on the rear side of each doubly coated film, the main current path is provided on the opposite film edge. In that case, the auxiliary current paths shown in FIG. 1 proceed alternately from the right-hand and left-hand edges and in each case extend into a partial region 6 defined by the auxiliary current paths of the counterelectrode.

Figure 3:
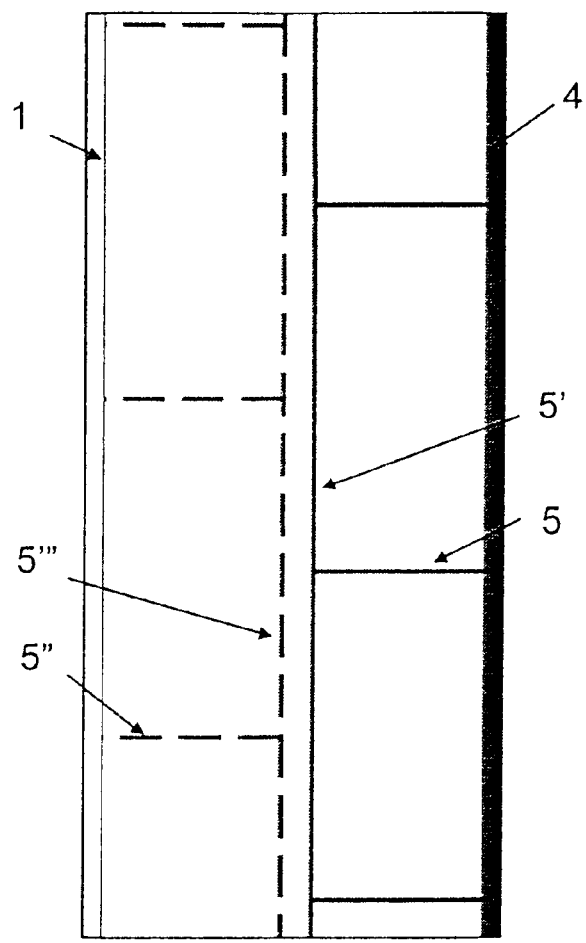

FIG. 3 shows a view in which an additional auxiliary current path 5' runs parallel to the main current path within the film. The auxiliary current paths 5 connect the auxiliary current path 5' to the main current path 4. The auxiliary current paths 5", 5"' of the rear-side counterelectrode are shown by broken lines. Since, in this exemplary embodiment, the current path structures are in each case restricted to one half of the film, superposition does not occur under any circumstances.

Figure 4:
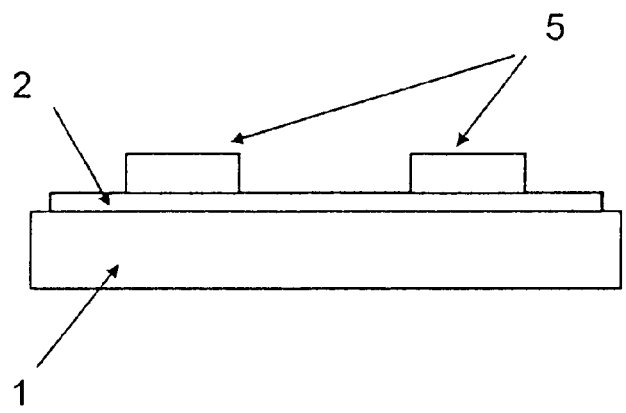

FIG. 4 shows a cross-sectional illustration through the film formed according to the invention. An electrically conductive layer 2 is applied on the carrier film 1 using coating techniques known per se, which layer, as shown in the exemplary embodiment above, is designed as a metal layer. It goes without saying that electrically conductive plastics can also be used for the electrically conductive layer 2.

Directly adjoining the surface of the electrically conductive layer 2, current path structures which are elevated above the surface are provided in the form of main and auxiliary current paths 4, 5, which are either formed integrally with the electrically conductive layer 2 or are subsequently applied to the layer 2. At any rate, the current path structures are preferably designed as strips 4, 5 running on the surface and are electrically conductively connected to the layer 2. The elevated nature of the main and auxiliary current paths 4, 5 designed as strips means that their thickness is increased, as a result of which the electrical sheet resistance is reduced relative to the resistance within the electrically conductive layer 2.

The invention has been explained in more detail above using a number of exemplary embodiments; however, the invention is not restricted to these exemplary embodiments. In the context of the invention, the carrier film can be formed from polypropylene, polystyrene, polyester, polycarbonate, PET, PEN, cellulose acetate or resist film; the metal layer and the current paths can be formed from zinc, aluminum, silver, gold, copper, magnesium or an alloy comprising a plurality of these metals; instead of the high-resistance metal layer, it is also possible to provide an electrically conductive plastic layer. The form of the film need not be in strip form, but rather may assume any desired form, depending on requirements.

The current paths, in particular the auxiliary current paths, can be formed with a gradient in their resistance. This resistance gradient can be provided by changing the composition, the width and/or the thickness of the current path(s). The auxiliary current paths 5 are preferably formed with a resistance that decreases in the direction of the respective main current path 4. In these cases, the sheet resistance ratio to be sought between current path structure and electrode layer relates to the thickest point on the auxiliary current paths.

LIST OF REFERENCE SYMBOLS

1 Carrier film
2 Electrically conductive layer
3 Longitudinal edge
4 Main current path
5 Auxiliary current path
6 Partial region
7 Tapering point

What is claimed is:

1. A film for a film capacitor, having an electrically insulating carrier film designed as a dielectric, and an electrically conductive layer which is applied on said carrier film and serves as an electrode, at least one current path structure being formed on the layer,
wherein the electrically conductive layer has a high sheet resistance of at least 5Ω in order to reduce breakdown-dictated capacitance losses, and in that, in order to reduce the total sheet resistance, the at least one current path structure has a lower sheet resistance than the electrically conductive layer.

2. The film as claimed in claim 1,
wherein the current path structure has at least one main current path and a plurality of auxiliary current paths, which branch off from the main current path(s).

3. The film as claimed in claim 2,
wherein the film is designed in strip form and the at least one main current path extends along a longitudinal edge of the film.

4. The film as claimed in claim 2,
wherein auxiliary current paths have, at their thickest point, a sheet resistance which is more than 20 times less than the sheet resistance of the electrically conductive layer.

5. The film as claimed in claim 2,
wherein the auxiliary current paths cover a maximum of 10 percent of the electrically conductive layer.

6. The film as claimed in claim 2,
wherein the current path structure has at least one tapering point serving as protection device.

7. A film capacitor having electrodes and also a dielectric, wherein at least one electrode and also the dielectric of the film capacitor are formed by a film as claimed in claim 1.

8. The film capacitor as claimed in claim 7,
wherein the capacitor is either formed from two carrier films which are coated on one side with an electrically conductive layer, the two electrically conductive layers each forming an electrode and the carrier films serving as dielectric insulation, or is wound from a carrier film, which is coated on two sides with an electrically conductive layer, and an uncoated film, resulting, in cross section, in a sequence of layers which alternately comprises electrically insulating material and an electrically conductive layer serving as electrode.

9. The film capacitor as claimed in claim 8,
wherein the current path structure has at least one main current path and a plurality of auxiliary current paths which branch off from the main current path(s), and the main and auxiliary current paths of two adjacent layers are arranged offset with respect to one another.

10. The film of claim 1, wherein the electrically conductive layer has a high sheet resistance more than 20Ω.

11. A film for a film capacitor, having an electrically insulating carrier film designed as a dielectric, and an electrically conductive layer which is applied on said carrier film and serves as an electrode, at least one current path structure being formed on the layer,
wherein the electrically conductive layer has a high sheet resistance of at least 5Ω in order to reduce breakdown-dictated capacitance losses, and in that, in order to reduce the total sheet resistance, the at least one current path structure has a lower sheet resistance than the electrically conductive layer, wherein the current path structure has at least one main current path and a plurality of auxiliary current paths, which branch off from the main current path(s), wherein the auxiliary current paths have, at their thickest point, a sheet resistance which is more than 20 times less than the sheet resistance of the electrically conductive layer.

12. A film for a film capacitor, having an electrically insulating carrier film designed as a dielectric, and an electrically conductive layer which is applied on said carrier film and serves as an electrode, at least one current path structure being formed on the layer,
wherein the electrically conductive layer has a high sheet resistance of at least 5Ω in order to reduce breakdown-dictated capacitance losses, and in that, in order to reduce the total sheet resistance, the at least one current path structure has a lower sheet resistance than the electrically conductive layer, wherein the current path structure has at least one main current path and a plurality of auxiliary current paths, which branch off from the main current path(s), wherein the current path structure has at least one tapering point serving as protection device.

* * * * *